United States Patent
Kay

Patent Number: 5,706,012
Date of Patent: Jan. 6, 1998

[54] RADAR SYSTEM METHOD USING VIRTUAL INTERFEROMETRY

[75] Inventor: John H. Kay, Concord, Mass.

[73] Assignee: The United States of America as represented by the Secretary of the Navy, Washington, D.C.

[21] Appl. No.: 572,210

[22] Filed: Dec. 13, 1995

[51] Int. Cl.$^6$ .................................................. G01S 13/00
[52] U.S. Cl. .................................. 342/156; 342/372
[58] Field of Search ................................ 342/372, 424, 342/156, 157

[56] References Cited

U.S. PATENT DOCUMENTS

| | | |
|---|---|---|
| 4,368,469 | 1/1983 | Ott et al. |
| 4,825,172 | 4/1989 | Thompson ............... 342/373 |
| 5,457,466 | 10/1995 | Rose ...................... 342/442 |

*Primary Examiner*—Theodore M. Blum
*Attorney, Agent, or Firm*—Elmer Goshorn

[57] ABSTRACT

The virtual interferometer is an improved method for generating multiple simultaneous transmit beams as effected by a phased array radar. The technique is particularly suited to a solid state active radar array having a transmit/receive (T/R) module that is located at each radiating element. Potential applications to radar systems include environments such as air traffic control in which wide area surveillance with high search rates may be required. With multiple simultaneous beam generation coupled with parallel receiver beamformers and processors, such a radar system could support large volume searches while preserving the narrow beam characteristics by using the full aperture for generation of each of the multiple beams. The multiple simultaneous beams are generated by applying a particular phase shift at each radiating element, with no requirement for amplitude modulation. To form the multiple simultaneous beams on transmit, the antenna is logically divided into a series of equal segments, with a quadratic or near-quadratic phase profile applied to each of the logical antenna segments. The curvature of the phase function determines the angular extent covered by the series of beams being generated. This phase function has the effect of focusing the radiation at a specific distance either in front of or behind the phased array antenna, depending on the sign of the curvature. Each of the logical antenna segments interferes coherently with the others, resulting in a constructive/destructive interference pattern in the far-field of the antenna.

14 Claims, 4 Drawing Sheets

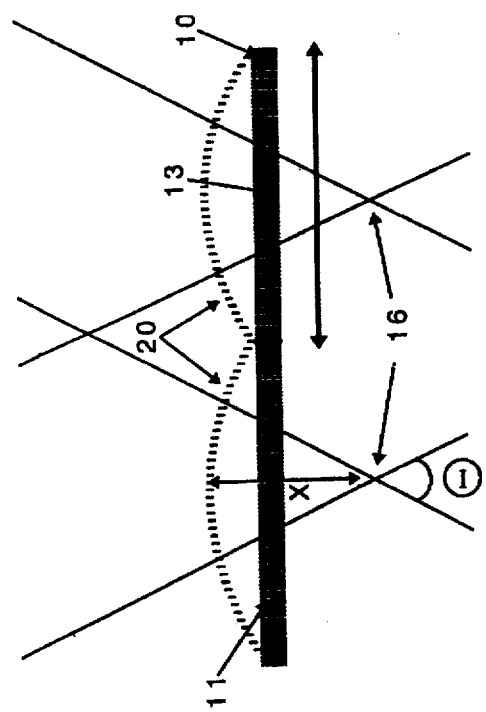
Figure: 1B
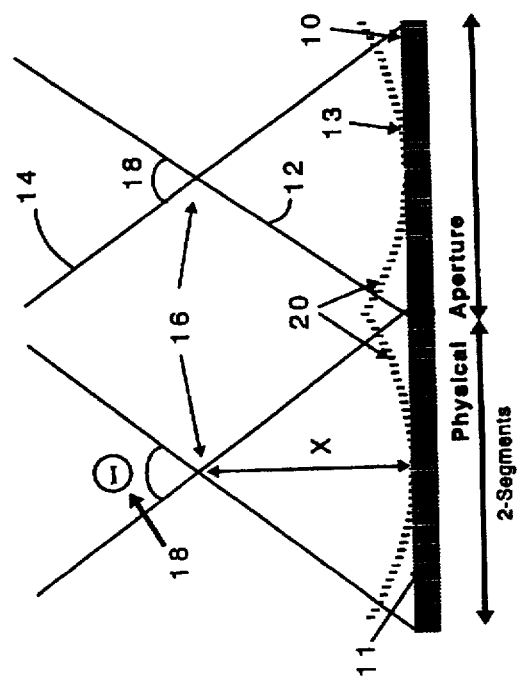
Figure: 1A

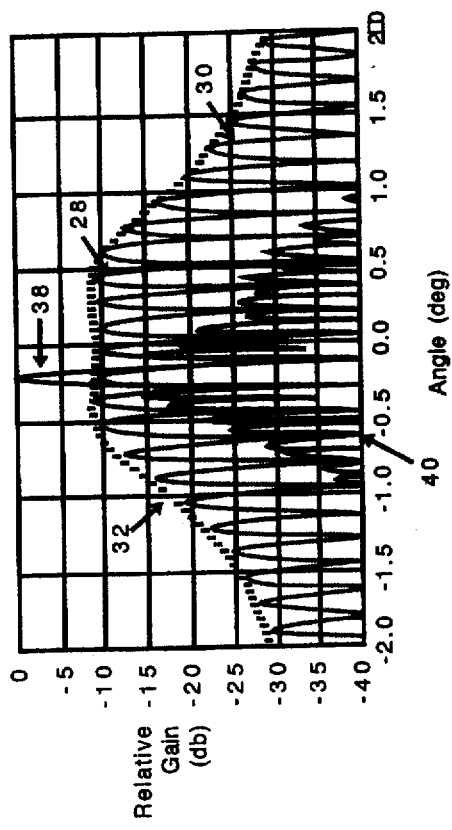
FIGURE: 3
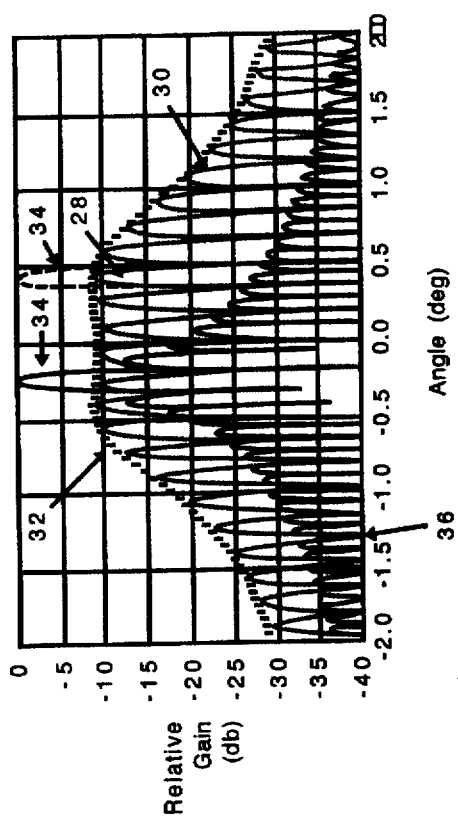
FIGURE: 2

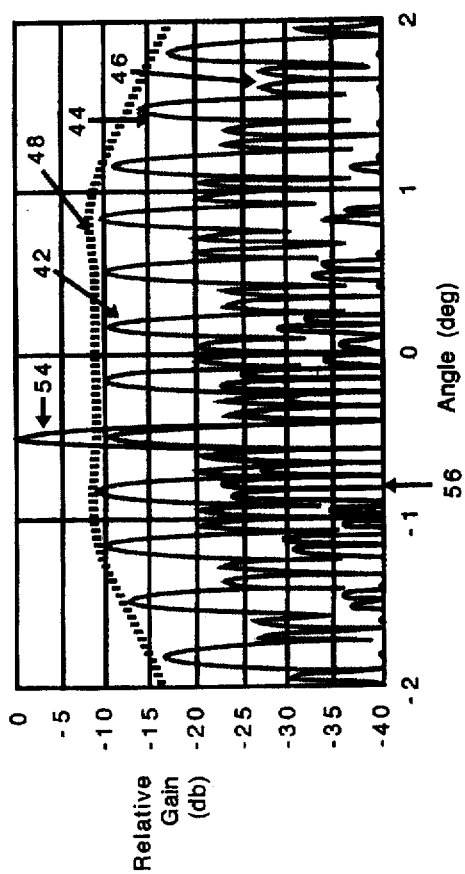
Figure: 5
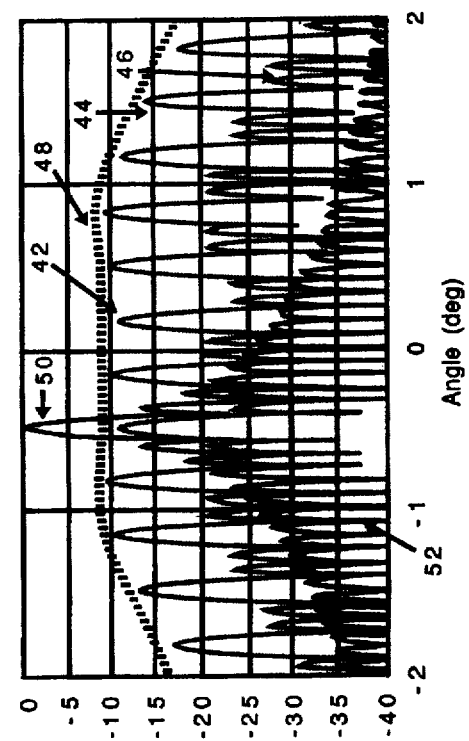
Figure: 4

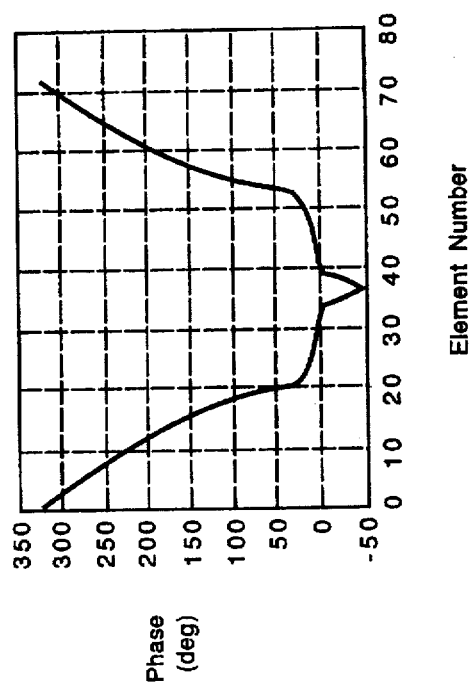
FIGURE: 7
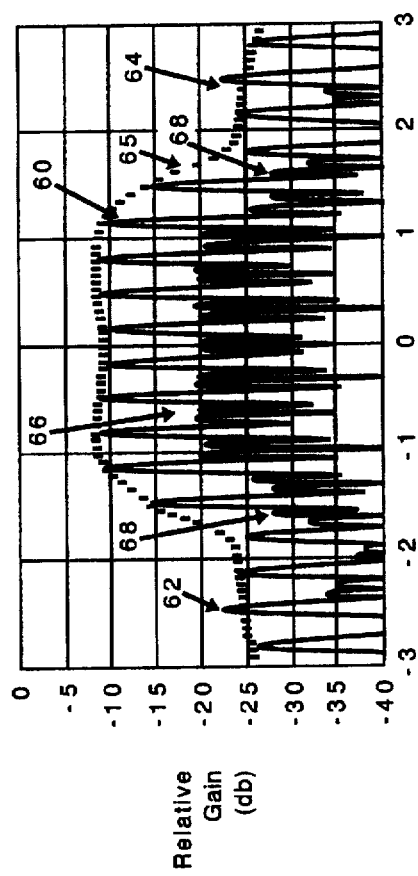
FIGURE: 6

RADAR SYSTEM METHOD USING VIRTUAL INTERFEROMETRY

Improved method involving a series of steps of selectively exciting a phased array antenna means of a radar that uses the technique of virtual interferometry for simultaneously generating two or more coherent focused transmit beams as the result of selecting a phase function of desired extent and curvature for dividing the antenna into two or more segments during the transmit mode for any operative cycle of the radar. More particularly, it concerns an improved series of steps of simultaneously generating two or more focused coherent transmit beams as the result of selecting a phase function such that the coherent broad transmit segment beams will constructively and destructively interfere in the far-field to form a multilobed transmit beam cluster. During the receive cycle of the radar, simultaneous independent receive beams are steered to the individual lobes of the transmit beam cluster so as to form multiple simultaneous two-way beams. The ability to form a transmit cluster of varying widths by modifying the curvature of the phase function used to focus the antenna segments permits the radar to generate any number of simultaneous beams from a single beam up to the maximum that can be supported by the receive beam former. The ability to change the spacing between the lobes of the transmit cluster by changing the number of transmit segments during any operative cycle of the radar permits the formation of a low sidelobe two-way beam. This degree of flexibility permits a radar employing virtual interferometry to optimally configure the antenna for enhanced flexibility during surveillance and analysis of any given area for the purpose of targeting, mapping, etc. or any combination thereof.

For clarification, the following terms are defined, as they will be used throughout:

1. Subarray: A physical division of the antenna. On transmit, the subarray segmentation generally corresponds to fixed time delay states. On receive, the subarray corresponds to a subunit of the aperture over which the electronic signals are combined prior to the beam former.
2. Segment: A logical division of the transmit aperture for the purpose of forming a multi-lobed transmit pattern using virtual interferometry. Each segment of the transmit aperture is excited with an identical phase function.
3. Segment Beam: The transmit pattern from any segment of the transmit aperture. Also referred to as a subaperture beam.
4. Envelope: The absolute magnitude of the segment beam.
5. Transmit Cluster Beam: The multi-lobed antenna pattern resulting from the coherent interference of multiple segment beams.
6. Transmit Beam: A single lobe of the transmit cluster beam, which when overlaid with a receive beam results in one of the multitude of radar beams formed by the technique of virtual interferometry.

BACKGROUND OF THE INVENTION

Various types of radar beams including a multitude of transmitted beams for scanning an area in cluster fashion have been formed in the past as evidenced by numerous antennae including platforms therefor. Most multibeam radars involve either a single broad transmit beam that is matched with a plurality of receive beams that cover the same angular extent as the broad transmit beam or it can involve a series of sequential transmit beams that are matched with a similar series of receive beams. For example, U.S. Pat. No. 5,323,162 to Fujisaka et al relates to a synthetic aperture radar system having a multibeam antenna for generating during any operative cycle a transmit beam and then receiving a series of receive beams encompassed by the transmit beam but with each of the receive beams of the series being in a different direction. As the result of the scanning by the radar system during any operative cycle and in rapid repetitive fashion, stationary and moving objects can be detected. U.S. Pat. No. 4,975,704 to A. K. Gabriel et al concerns an airborne synthetic aperture radar (SAR) means for providing topographic mapping of surveyed surface terrain. The SAR means as provided on an airborne platform provides opposed side looking SAR means each with a different line of sight but simultaneously focused on any given surface terrain under surveillance. During processing by the SAR means of any radar raw data, a difference interferogram is provided for effecting topographic terrain mapping of a surveyed area. A pending patent application to Balser et al filed 21 Oct. 1994 and having Ser. No. 08/321,994 discloses a SAR means for an airborne platform having phased array antenna means utilizing a real interferometry technique for generating a series of transmit beams. To this end, a series of two transmit apertures are provided at either end of the antenna means for transmitting high power, interferable transmit beams at either end of the antenna means. During any operative cycle of the SAR, a multitude of transmit beams are subject to a constructive/destructive relationship to form a cluster beam and then a series of receive beams for analysis. However, none of the aforediscussed references whether taken alone or in any combination remotely suggest the improved method of the instant invention involving the step of selectively exciting a phased array antenna of solid-state transmit/receive (T/R) modular construction that uses the technique of virtual interferometry for simultaneously generating at least two or more radar focused coherent transmit beams during any transmit mode for any operative cycle of the radar. When two or more coherent focused transmit segment beams are initially simultaneously generated during any operative cycle of the radar, a transmit cluster beam of desired configuration is formed. Moreover, the radar is logically subdivided into several segments on transmit such that each of the segments is excited by a phase function which causes the radiation to have a convergent or divergent near-field portion and a divergent far-field portion. When any series of two or more transmit segment beams is generated during any operative cycle of the radar, these beams at their far-field position have a constructive/destructive relationship so as to form a transmit cluster beam of desired configuration. One of the advantages of the improved method is the flexibility of the radar that permits the transmit segments for any operative cycle to have a prescribed azimuth focal point that is related to the preselected phase function for generating any given transmit beam, thus enabling the transmit segment beam to cover a narrower or broader angular extent so as to encompass more or fewer transmit beams in the transmit beam cluster. Additionally, the ability to vary the segmentation of the transmit aperture into more or fewer units on any operative cycle of the radar causes the individual lobes of the transmit beam cluster to be separated by varying amounts, so as to control the adverse effects of grating lobes.

SUMMARY OF THE INVENTION

An object of the invention is to generate a series of simultaneous transmit beams for a phased array multibeam radar using a distributed microwave power source across the entire aperture. The simultaneous transmit beams are generated by applying a prescribed phase shift to each radiating element in such a way that segments of the antenna focus the radiated energy to a region either in front of or behind the radiating aperture to form broad segment transmit beams from each transmitting segment. The constructive/destructive interference resulting from the coherent interactions of radiation patterns generated by the separate segment beams results in a multiple-lobed transmitted cluster beam. One may then match the multiple transmitted beam pattern with a series of discrete receive beams for the purpose of constructing separate two-way radar beams that have particularly desired properties.

Another object of the present invention to provide an improved method for selectively exciting a phased array antenna means that uses the technique of virtual interferometry to generate two or more focused coherent transmit beams to form a far-field beam of desired configuration where the method step of selectively exciting the antenna is enhanced since any transmit beam during any radar operative cycle stems from a phase function having a preselected mathematical and/or graphical relationship that permits selection of more than one cluster beam configuration so as to increase the scanning sensitivity and flexibility of the radar in carrying out any mission for target detection, mapping, general surveillance or any combination thereof.

It is another object of the invention is to provide an improved method for not only selectively exciting a phased array antenna that uses the technique of virtual interferometry for initially simultaneously and selectively generating two or more focused transmit segment beams to form a cluster beam of desired configuration, but also be able to generate a transmit beam cluster of any desired spacing between lobes so as to minimize the adverse effects of grating lobes that are the result of segmenting the receive antenna into subarrays.

Still another object of the invention is to provide an improved method for choosing the phase function, determined by the focal point, to be used for each transmit segment so as to encompass more or fewer lobes in the transmit beam cluster, thus permitting the radar use either more beams with lower gain or fewer beams with higher gain.

Still another object of the invention is to provide an improved method for selecting a non-quadratic phase function to be applied for each segment of the transmit antenna so as to equalize the gain in each of the individual two-way beams.

And still another object of the invention is to provide an improved method for simultaneously and selectively generating two or more focused transmit segment beams to form a transmit cluster beam of desired configuration all as effected by a radar antenna being made up of a plurality of solid-state transmit/receive modules all of which contribute to a reliable solid-state construction for any suitable platform and its use as well as the antenna being of uniform power distribution throughout its extent.

In summary, an improved method involves the step of selectively exciting a phased array transmit antenna that uses the technique of virtual interferometry as arranged on any suitable platform for selectively and initially simultaneously generating two or more focused coherent transmit segment beams where the generation of any transmit cluster beam involves the step of preselecting a phase function having a quadratic mathematical or non-linear graphical relationship, in each segment of the transmit aperture, for forming a transmit segment beam of desired configuration having convergent/divergent portions that include a common azimuth focal distance relative to the antenna for each transmit segment beam so that when two or more coherent, focused transmit segment beams coherently interfere in the far field a transmit cluster beam of desired configuration is formed. The multiple-lobed transmit beam cluster is made up of the coherently interfering transmitted beams from each segment of the array.

Moreover, the improved method involves the step of also being able to vary the width of the transmit beam cluster by changing the curvature of the transmit phase function so as to encompass more or fewer lobes in the transmit beam cluster. Additionally, choosing a subdivision of the transmit aperture into more segments causes the individual lobes to be formed further apart, which minimizes the detrimental effects of grating lobes that arise from segmenting the receive aperture into a number of receive subarrays. It should now be evident that by the various steps of carrying out the improved method, as effected by the phased array radar of solid-state, reliable construction, offers a wide range of flexibility and reliability in simultaneously generating two or more focused transmit beams during the transmit mode for any radar operative cycle so as to increase the sensitivity of the radar in carrying out the method relative to any scanned area for stationary or moving target detection, mapping, general surveillance or any combination thereof.

Some of the advantages in using the technique of virtual interferometry for generating transmitted radar beams are as follows:

1. A uniformly illuminated aperture is used during transmit; thus making this technique suitable for use on low-power, solid-state modules;
2. Any series of transmit beams can be generated in real time in response to phase commands so that either the number of beams can be increased for a greater search rate, or the number of beams can be reduced for greater sensitivity;
3. Beam spacing can be any integral multiple of lambda ($\lambda$) divided by L, where $\lambda$ is the transmitted wavelength and L is the aperture length;
4. With wider transmit lobe spacing, as effected by subdividing the transmit aperture into more focused segments, two-way sidelobes can be suppressed as effected by receive-only taper;
5. Relative beam gain can be either held constant or modulated as effected by applying different non-quadratic phase functions in the transmit segments; and a high percentage of transmit energy is contained within a cluster beam.

In view of the foregoing, other objects and advantages of the invention will become more apparent when taken in conjunction with the appended specification, claims and drawings as hereinafter described.

BRIEF DESCRIPTION OF THE DRAWINGS

FIG. 1A is a schematic view with parts broken away and also depicted in dotted and solid lines, and it illustrates in dotted and solid lines two different sets of representative transmit segment beams; with each set being an operative embodiment of a phased array antenna means that uses the technique of virtual interferometry for carrying out the improved method of simultaneously generating for either operative embodiment two or more focused transmit beams (partially broken away) for effecting scanning of an area in enhanced fashion. The outer broadened portions of either set of these transmit beams though not fully shown interfere in the far-field so as to form a multiple-lobed cluster beam. In this figure, the transmit aperture is broken up into two segments, which are focused to the points 16 in the near field of the antenna causing the transmit segment beams to subsequently diverge and interfere in the far field.

FIG. 1B is another schematic view with portions removed; and it illustrates the use of a divergent phase function to form the transmit segment beams. In this case, the segment beams diverge as if they had originated from point 16, still to continue their divergence and interfere coherently in the far field.

FIGS. 2-3 are separate graphical views, with FIG. 2 illustrating how the individual transmit segment beams form a multilobed transmit cluster beam (with the envelope of the cluster beam being outlined by a dotted line but with the lobes of the cluster beam being depicted by partially faint solid lines) and a representative receive beam (solid lines) superimposed thereon; and with FIG. 3 being also the same transmit cluster beam as in FIG. 2 but with a resolved two-way beam superimposed thereon (solid lines); where all of the beams (cluster, receive and two-way beams) for both Figures stem from a plurality of two initially simultaneously generated focused coherent transmit beams as effected by the phased array antenna means as shown FIG. 1A; and where these FIGS. 2-3 depict various aspects of an operative embodiment of the invention.

FIGS. 4-5 are separate graphical views similar to FIGS. 2-3; but where the transmit aperture is divided up into four equal segments, so that the constructive/destructive interference between the transmit segment patterns from each of the separate transmit segments causes adjoining lobes of the multilobed transmit cluster beam to be separated by a pair of lower side lobes with the transmit lobes and lower transmit side lobes being indicated by partially hint solid lines and with the transmit cluster beam having a broadened envelope as compared to the cluster beam of FIGS. 2-3 and as indicated by the dotted line in FIGS. 4-5. A receive beam (solid lines) is superimposed on the cluster beam in FIG. 4 while a two-way receive beam (solid lines) is superimposed on the cluster beam of FIG. 5. The two-way sidelobes of FIG. 5 are lower than the two-way sidelobes of FIG. 3.

FIG. 6 is another graphical view of the transmit beam cluster (with the envelope of the beam cluster being indicated by a dotted line) of a four-aperture virtual interferometer; and it illustrates how the relative gains of the transmit lobes of a cluster beam can be selectively adjusted by the use of a nonquadratic function; with a nonquadratic function reducing the amount of energy that is transmitted outside the main portion of the beam cluster. Also, the transmit lobes outside the main cluster in FIG. 6 have reduced gain relative to corresponding lobes generated by a quadratic function for the virtual interferometer in FIGS. 2-3 and 4-5.

FIG. 7 is another graphical view; and it illustrates a nonquadratic phase function as applied to each of the four segments for the virtual interferometer of FIG. 6 and for effecting generation of the cluster beam therein.

DETAILED DESCRIPTION OF THE SPECIFICATION

With continued reference to the drawings and FIG. 1A thereof, an L/2 configuration is illustrated for simultaneously transmitting two transmit segment beams, shown by solid lines. As further shown in FIG. 1A, the transmit aperture is broken up into two segments, where each transmit segment transmits a transmit segment beam. Now as each segment of the aperture is illuminated, it is desired to make the aperture behave as if the energy is transmitted through two slits so as to form an interference pattern in the far field. The solution is to focus each of the transmit segments (of length L/2) at a distance in front of the antenna as effected by using a quadratic phase function. FIG. 1B shows the corresponding case where the energy diverges as if it emanated from two focal points the same distance X behind the antenna. The focal distance, X is related to the desired width of the beam cluster. Accordingly, X is equal to L divided by 2 times N then times the tangent of one half $\Theta$; where L is the length of any transmit subaperture, N is the number of transmit segments for any operative cycle of the phased array antenna means, and $\Theta$ is the apex angle between the convergent/divergent portions of any transmit beam. The phase function, $\phi$ (phi), at a distance y from the center of the segment, that is needed to accomplish this focusing is expressed by the mathematical formula of f of y being equal to the product of $\pi$ (Pi) times the square of y and where this product is divided by the product of the wavelength $\lambda$ of any given beam to be transmitted by the antenna means times the focal distance, X. Y of this formula is the distance from the center of each subaperture of the antenna means to the point for which the phase is being calculated. Each of the transmit segments generates a broad segment beam. The coherent interference between the transmit segment beams results in a multilobed transmit beam.

The transmit and receive beams which result from a two-aperture virtual interferometer (in which the transmit aperture is subdivided into two segments) is shown in FIG. 2 with the receive beam being superimposed on the eight-beam transmit cluster. As further shown in FIG. 3 with the eight-beam transmit cluster is the two-way beam superimposed thereon. The receive pattern in FIG. 2 is formed by combining the subarray receive outputs with equal amplitude weights and a linear phase ramp so as to point to the desired location centered at one of the lobes of the transmit cluster beam. For a multiple receive beam antenna, each of the subarrays would be steered to the center of the transmit cluster, and the subarray outputs would be fed into a beam former which then combines the subarray outputs into separate receive beams centered at each of the lobes of the transmit cluster. To avoid excessive grating lobes due to the receive subarray combining, especially for the outer beams in a cluster, the receive subarray spacing, Ls must be small enough, that $\lambda$ over Ls is greater than p times the sine of $\Theta$, where p is on the order of 1.2. Thus, a wider beam cluster used to accommodate many transmit beams, or a higher order interferometer (more segments in the transmit aperture) requires that the receive aperture be subdivided up into more and smaller receive subarrays. Generally, the required number of receive subarrays into which the antenna means must be subdivided to meet a particular grating lobe requirement is proportional to the number of simultaneous transmit beams times the number of transmit subapertures. Although not all the receive beams are shown in FIGS. 2 and 4, it is to be understood that any receive beam, the main lobe thereof is always centered on a main lobe 28 of a transmit cluster beam as indicated by receive beam main lobe 34, a solid line in FIG. 2; and another receive beam main lobe 34' dotted lines also in FIG. 2.

From this description, it can be first understood how the virtual interferometer first got its name: with the application of the quadratic phase function, each segment of the transmit antenna means behaves like a Fresnel lens and actually focuses the energy into a small region displaced a distance, X from the physical aperture. These energy concentrations (two in the simplest case) act like small virtual transmit apertures located in front of the physical aperture, and will interfere coherently with each other in the far field. Thus, the virtual interferometer is formed in space and displaced from the physical aperture of the antenna means. A phase function of the opposite sign for any transmit segment will in fact form this virtual interferometer as a virtual image behind the physical aperture of the antenna means (as indicated in FIG. 1B) rather than in front of it, so a physical concentration of power or energy is not a necessary ingredient, though it helps to conceptualize the action of a virtual interferometer.

Several of the properties of the virtual interferometer are evident in this simplest form. The energy is clearly uniformly distributed along the transmit aperture, so it is directly suitable to a solid state implementation consisting of equal power modules. Additionally, the cluster can be broadened or narrowed by changing the focal distance, X. Since the beams are spaced by λ over 2 times L (independent of the focal distance), changing the focal distance changes the number of lobes in the transmitted cluster beam. Additionally, since the transmitted energy is largely confined to the cluster, changing the cluster width also changes the gain of each beam in real time to accommodate changing sensitivity requirements.

As further illustrated in FIG. 1A, a two aperture virtual interferometer 10 is made up of two transmit segments 11 and 13. The radiating elements are excited with a phase function for initially simultaneously generating two focused transmit segment beams of corresponding shape. Each segment beam has a near-field convergent portion 12 and a far-field divergent portion 14 (as the result of each beam being generated by a preselected quadratic phase function). As further explained hereinafter relative to FIGS. 2–7, two or more coherent focused transmit segment beams in being initially and simultaneously generated causes formation, as the result of constructive/destructive interference between the divergent portions of the plurality of two or more segment beams, so as to form a multi-lobed cluster beam of desired extent for scanning any selected area. As further indicated in FIG. 1A, the preselected quadratic phase function for any transmitted beam is indicated by dotted lines 20 so that any initial focused transmit beam as effected by a phased array antenna has convergent/divergent portions. If the sign of the quadratic phase function is reversed, the transmit energy will radiate as if it emanated from a point 16' behind the antenna, as depicted in FIG. 1B. In this case, the radiation does not converge, but diverges from the face of the aperture to the far field.

It is noted here that antenna 10 may be powered by solid-state transmitter/receiver (T/R) modules of low power output per module, yet lightweight construction. Such construction of the antenna not only enables uniform power distribution throughout its extent but it also enables the antenna being applicable to a wide variety of platforms while at the same time exhibiting a high degree of reliability.

As further depicted in FIG. 2, when the transmit aperture is subdivided into two segments, with a quadratic phase applied to each segment, each segment will generate a broad transmit segment beam, the envelope of which is indicated as 32. When the two transmit segment beams coherently interfere, a multilobed cluster beam results. The equal-gain central lobes 28 of the transmit cluster are used to form two-way beams, while reduced-gain lobes 30 outside the main cluster constitute an unwanted source of wasted energy. As the receive beam former generates a receive beam 34 to match one of the transmit lobes, the resulting two-way beam is shown in FIG. 3 as 38. Generally, the receive beam former will be constructed to produce receive beams to match each of the central lobes of the transmit cluster resulting in multiple two-way beams of uniform gain and equal spacing.

As further illustrated in FIG. 4, when the transmit aperture is divided into four equal segments, each being excited with a selected phase function so as to generate a broad transmit segment beam pattern 48, the constructive/destructive interference between the coherent transmit segment beams results in the multiple lobed transmit cluster 42, where each high-gain lobe is separated by two lower-gain side lobes 46. Again, outside the main beam cluster, outer transmit lobes 44 are progressively reduced in gain. As in FIG. 2, a representative receive beam 50 is overlaid with the transmit cluster. Since the transmit lobes are spaced further apart by the four aperture virtual interferometer configuration, the resulting two-way beams as illustrated at 54 in FIG. 5 have lower sidelobes 56 than the sidelobes 40 of the two-way beams 38 for the two-aperture case as shown in FIG. 3. Moreover, because the side lobes of the two-way beam of FIG. 3 or 5 are of lower extent than the receive beam of FIG. 2 or 4; it is evident that phased array antenna 10 and the beam former therefor not only contribute to the improved method, but provide an enhanced degree of flexibility in carrying out any aspect of an operative embodiment of the radar relative to any platform being used and in meeting the sensitivity and surveillance requirements for target detection, mapping, etc.

The above discussion illustrated a two-slit virtual interferometer configuration and a four-slit configuration as depicted in FIGS. 1–3 and 4–5 respectively. One can partition the transmit aperture up into any integer number of sub-aperture segments. In that case, the transmit beams will be spaced by a distance of N times λ over L, where N is the number of sub-aperture segments into which the transmit aperture of length L was divided; and λ is the wavelength of the radiation. The focal distance must be changed to accommodate the smaller subapertures, according to the following mathematical formula, where X is equal to L over 2 times N then times the tangent of λ over 2. With the wider beam spacing for a higher order virtual interferometer, a fixed number of beams will necessitate a wider cluster angle. More widely spaced transmit lobes allow for lower two-way side lobes with receive-only aperture taper as shown in FIGS. 4–5 respectively As shown in FIG. 5, an L/4 configuration has 24 Decibel (dB) sidelobes without taper, and can achieve −35 dB side lobes with relatively modest receive-only taper. An L/2 configuration, on the other hand, can only achieve −24 dB two-way side-lobes with taper as shown in FIG. 3, since additional receive taper will cause the receive main lobe to interact with the adjacent lobes of the transmit cluster. The choice of which order of virtual interferometer to use will depend on system constraints such as receive subarray size as well as on two-way sidelobe requirements. Note, however, that this choice can be made in real time, since the only difference between any order of virtual interferometer and any other order virtual interferometer is a different phase function. As pointed out previously, the maximum usable width of the beam cluster is determined by the subarray size, so a system may be able to accommodate a higher order virtual interferometer by selectively changing the transmit function, but a higher order interferometer will reduce the number of transmit lobes which fit within a given angular extent, so any radar having a fixed receive subarray size will in general only be able to support high order virtual interferometer configurations with fewer beams than with lower order configurations.

The above discussion generated the virtual interferometer by coherently combining broad transmit segment beams from subaperture segments of the transmit aperture, focused with a quadratic phase function. The quadratic phase was used to generate the energy concentrations characteristic of an interferometer. However, one need not view the virtual interferometer strictly in those terms. Whatever beam pattern the transmit subapertures generate separately will be modulated by the interference with the adjacent subaperture beams. This interference can be mathematically expressed by an interferometric beam pattern F(θ) that is of the form, F(θ) being equal to the numerator product of the sine of π times L over λ then times sine (Θ) all over the denominator product of N times the sine of π times L over N times λ then times sine (Θ). With this in mind, the initial quadratic transmit phase is simply a method to generate a wide sector beam, and the multiple-lobed transmit cluster results from the modulation of the transmit segment beam for each subaperture with the interference pattern F(Θ). The virtual interferometer is not limited to a quadratic phase only, but can be generalized to any phase function that generates the desired broad subaperture beam which is then modulated by the interference pattern. An example of this is shown in FIG. 6, in which a flattened subaperture beam was generated in order to equalize the gains of the individual two-way beams and suppress out-of-cluster energy better than a simple quadratic function with its inherent Fresnel ripple. Note the sharp cutoff of the pattern at the edge of the cluster, which is achieved with a phase synthesis technique. The phase function used for each subaperture is shown in FIG. 7, though different antenna parameters will require different non-quadratic phase functions to equalize the transmit lobe gains. By use of a non-quadratic phase function, one can tailor the shape of the transmit segment beam for meeting a multitude of purposes, the most obvious being to compensate for gain modulations resulting from receive aperture subarrays. The virtual interferometer does not require the particular method of phase synthesis used in this example, but it permits as suitable any technique which can generate an appropriate broad segment transmit beam.

A multiple-lobed transmit cluster is depicted in FIG. 6. This transmit cluster is made up of eight lobes 60, with side lobes 62 and 64 on either side of the eight main lobes 60. Sidelobes 66 and 68 are located between any immediately adjacent main lobes 60 and between any immediately adjacent side lobes 62 and 64. This multiple transmit cluster of FIG. 6 is generated by the constructive/destructive interference between the four coherent transmit segment beams transmitted by four subapertures (not shown) where each transmit segment beam stems from a preselected nonquadratic, nonlinear phase function. In being a nonquadratic phase function as graphically shown in FIG. 7, the gain of the two-way beams is substantially equalized with Fresnel effects being minimized as compared to Fresnel effects for a selected quadratic phase function as would be the case in FIGS. 2–5 for any transmit cluster beam.

As further evident in FIG. 7, a non-quadratic function selection can readily be determined by phase synthesis as indicated by curve 70. Though the curve of FIG. 7 is of approximate inverted bell shape, it can have any suitable curvilinear profile in obtaining a broadened transmit beam for each of the subdivided transmit subapertures. One of the advantages in selecting a nonquadratic function is that it equalizes the gain of various lobes in the resultant transmit cluster beam of FIG. 6. Also the selection of the nonquadratic function in reducing the side lobe gain for both the cluster beam and any receive beam (not shown); then this selection also causes reduction in the side lobe gain for the two-way beam (also not shown). Moreover, the improved method of the invention in allowing selectivity in forming multiple-lobed transmit cluster beams of varying widths and also containing a varying number of main lobes in the transmit cluster beam (as the result of a selected quadratic or nonquadratic phase function) advantageously permits the obtaining of an optimum sensitivity, side lobe level and sampling rate.

In view of the foregoing, it is evident that the virtual interferometer generates any number of equally spaced simultaneous beams by selectively dividing the transmit aperture into a number of equal subaperture segments, with the element phases for any subaperture being spoiled to produce wide sector beam for each of the subaperture segments of the transmit aperture. The number of beams and beam spacing can be controlled in real time by application of phase functions. The virtual interferometer generates these simultaneous beams using a uniformly illuminated aperture, making it suitable for low power density solid-state devices. The transmit power is well confined to the beam cluster, thus making the virtual interferometer highly efficient. Generalizations involving an increased number of transmit subaperture segments and nonquadratic phase weighting permit lowered sidelobes and improved gain equalization, respectively. It should also be evident that the radar in carrying out the improved method is highly versatile and flexible as well as providing numerous illumination patterns, such as two or more coherent focused beams being initially simultaneously generated for scanning an area in detecting a target. It should also now be evident that preselection of the phase function within the constraints imposed by the receive subarray size contributes to matching the far-field transmitted beams with any receive beam(s). This not only effectively matches two-way beam resolution, but also maximizes the sensitivity of the improved phased array radar in carrying out the improved method as well as maximizes the sensitivity of the radar in carrying out a mission on any given platform for targeting, mapping, general surveillance, etc. Moreover, it is to be understood that the particular electronic circuit design including computerization thereof is believed to be within the skill of the art for carrying out the improved method steps of the invention as effected by the phased array antenna, beam former, etc.

While the invention has been particularly shown and described with reference to several preferred embodiments thereof; it will be understood by those skilled in the art that the foregoing and other changes in form and detail may be made therein without departing from the spirit and scope of the invention as covered by the appended claims and a reasonable interpretation thereof.

What is claimed is:

1. A method of selectively generating and simultaneously forming a plurality of at least two radar focused coherent transmit segment beams as well as simultaneously forming a receive beam as effected by radar phased array antenna means having both transmit and receive apertures that uses the technique of virtual interferometry during the transmit mode for any operative cycle thereof, the method comprising the steps of:

selecting a phase function of desired extent and curvature as represented by either a quadratic or nonquadratic nonlinear function for generating a coherent focused transmit segment beam, dividing the transmit aperture of the antenna means into a plurality of at least two corresponding transmit subaperture segments with the extent of any transmit subaperture segment being identical to the extent of the selected phase function, and simultaneously generating a plurality of at least two coherent focused transmit segment beams from the corresponding transmit subaperture segments after selection of any phase function and after dividing up the transmit aperture into at least two transmit subaperture segments during any operative cycle of the radar antenna means so as to effect simultaneous generation and projection of at least two coherent focused transmit segment beams from the corresponding transmit subaperture segments with each focused transmit segment beam having a near-field convergent portion adjacent its associated subaperture and also having a far-field divergent portion with a common focal point between these portions, so that each transmit subaperture segment generates an identical segment beam in the far field and adjacent overlapping portion of the transmit segment beams coherently interfere in the far field to form a multi-lobed transmit cluster beam.

2. A method as set forth in claim 1, wherein it includes the step of simultaneously generating multiple receive beams in response to simultaneous generation of at least two focused subaperture transmit segment beams during the transmit and receive modes for any operative cycle of the radar antenna means with any receive beam being made up of one main lobe and an opposed series of side lobes on either side of the main lobe with any series of side lobes having a progressively diminishing gain value in taper-like fashion and in a direction away from the main lobe on either side thereof; and wherein any receive beam will be arranged so as to align with one of the lobes of the multi-lobed transmit cluster beam.

3. A method as set forth in claim 1, wherein it includes the step of forming a two-way beam in response to simultaneous generation of at least two focused coherent transmit beams and also of multiple receive beams during any operative cycle of the radar antenna means; with the two-way beam having a main lobe and an opposed series of side lobes on either side of the main lobe.

4. A method as set forth in claim 1, wherein the step of determining the focal point for any transmitted subaperture segment beam generated by the radar antenna means is effected by the mathematical relationship of the focal distance of any focal point for any transmitted beam being equal to the length L of any transmit subaperture segment divided by the product of two times the number of transmit subaperture segments for any operative cycle of the radar antenna means then this product times the product of the tangent of one half theta $\Theta$ where $\Theta$ is the corresponding apex angle between the convergent/divergent portions of any transmitted subaperture segment beam.

5. A method as set forth in claim 1, wherein the step of selecting a phase function for any transmitted subaperture segment beam can be determined by a quadratic function having the mathematical relationship of phi $\phi$ of y being equal to the product of pi $\pi$ times the square of y divided by the product of lambda $\lambda$ times x where $\phi$ is the phase angle between any ray of a transmitted beam and its selected quadratic function, pi is a known constant, lambda is the wavelength of any transmitted beam by the radar antenna means, y is the distance from the azimuth center of the transmit subaperture segment to the preselected point of the selected phase function for determining $\phi$; and x is the predetermined focal distance between any point along the loci of points for the selected quadratic function of the transmit subaperture segment and the azimuth focal point of the transmitted beam.

6. A method as set forth in claim 3, wherein it includes the step of determining the number of beams of a particular type which may be supported based on the length of each receive subarray of the receive subarrays relative to the number of transmitted subaperture beams being generated by the radar antenna means where the receive subarray length is related to the number of beams and interferometer configuration according to a comparison of the values obtained by two different linear functions with the first linear function being lambda $\lambda$ the wavelength of the radiation being radiated by the radar antenna means divided by the length of each transmit subaperture segment and with the second linear function being the product of p, a constant having a value of approximately 1.2 times sine $\Theta$ where $\Theta$ is the apex angle of any transmitted focused beam by the radar antenna means such that the first linear function value must be greater than or equal to the second linear function value so that the selected length for any receive subarray minimizes the effect of any grating lobe.

7. A method as set forth in claim 1, wherein the step of simultaneously generating a plurality of at least two focused transmitted subaperture beams is effected by the radar antenna means having a plurality of transmit/receive modules of solid-state construction.

8. A method as set forth in claim 1, wherein an interferometric array pattern of adjacent transmitted focused beams as generated by transmit subaperture segments of the radar antenna means in response to a selected quadratic phase function can be determined by the mathematical formula F of $\Theta$; where F of $\Theta$ is equal to the numerator of sine of $\pi$ times L divided by $\lambda$ times the sine of $\Theta$ with this numerator sine $\pi L/\lambda$ sine $\Theta$ being divided by the denominator of N times the product of sine of $\pi$ times L divided by the product of N times $\lambda$ then times the sine of $\Theta$ with this denominator being N times sine $\pi L/N\lambda$ times sine $\Theta$; where $\pi$ is a known constant, L is the focal distance of any transmitted beam relative to its transmit subaperture segment, N is the number of transmit subaperture segments for any transmit operative cycle of the radar antenna means, $\lambda$ is the radiation wavelength radiated by any transmitted beam during an operative cycle of the antenna means and $\Theta$ is the apex angle at the focal point between the convergent/divergent portions of any transmitted subaperture beam.

9. A method of selectively generating and simultaneously forming more than two radar focused subaperture transmitted beams as well as simultaneously forming at least one receive beam as effected by radar phased array antenna means having both transmit and receive apertures that uses the technique of virtual interferometry during any transmit mode for any operative cycle thereof, the method comprising the steps of:

selecting a phase function of desired extent and curvature as represented by either a quadratic or nonquadratic nonlinear function for generating a focused transmitted subaperture beam during any transmit mode for any operative cycle of the radar phased array antenna means, dividing the radar antenna means into more than two corresponding transmit subaperture segments with the extent of any transmit subaperture segment being identical to the extent of the selected phase function, and simultaneously generating more than two coherent focused transmitted subaperture beams from the corresponding subaperture segments after selection of any phase function and after division of the transmit aperture into transmit subaperture segments corresponding to the number of transmitted segment beams during any transmit mode for any operative cycle of the radar antenna means so as to effect simultaneous generation and projection of more than two coherent focused transmitted segment beams from the corresponding transmit subapertures with each focused transmitted segment beam having a near-field convergent portion adjacent its associated transmit subaperture segment and a far-field divergent portion with a common focal point between these portions; and with adjacent corresponding far-field portions of adjoining transmitted subaperture beams of more than two simultaneously generated transmitted subaperture beams during the transmit mode for any operative cycle of the radar antenna means having a constructive/destructive interference region so as to form a transmit cluster beam made up of multiple transmit lobes; with the multiple lobes being made up of a series of main lobes and opposed series of side lobes of lesser gain with adjacent main lobes of the series being spaced and separated by sidelobes of reduced gain as compared to the series of main lobes, with this spacing between adjacent main lobes of the series contributes to reduction in side lobe gain upon formation of a two-way beam during any combined simultaneous transmit/receive mode for any operative cycle of the radar antenna means.

10. A method as set forth in claim 9, wherein it includes the step of simultaneously generating more than one receive beam in response to simultaneous generation of more than two focused coherent transmitted beams during the transmit and receive modes for any operative cycle of the radar antenna means with the receive beam being made up of one main lobe and an opposed series of side lobes on either side of the main lobe with any series of side lobes having a progressively diminishing gain value in taper-like fashion and in a direction away from the main lobe on either side thereof.

11. A method as set forth in claim 9, wherein it includes the step of forming a two-way beam in response to simultaneous generation of two or more focused coherent transmitted subaperture beams and at least one receive beam during any operative cycle of the radar antenna means with the two-way beam having a main lobe and an opposed series of side lobes on either side of the main lobe.

12. A method as set forth in claim 9, wherein the step of determining the focal point for any transmitted subaperture beam generated by the radar antenna means is effected by the mathematical relationship of the focal distance of any focal point for any transmitted beam being equal to the length L of any transmit subaperture segment divided by the product of two times the number of transmit subaperture segments for any operative cycle of the radar antenna means then this product times the product of the tangent of one half theta $\Theta$ where $\Theta$ is the corresponding apex angle between the convergent/divergent portions of any focused transmitted subaperture beam generated during any operative cycle of the radar antenna means.

13. A method as set forth in claim 9, wherein the step of simultaneously generating a plurality of two or more focused coherent transmitted beams is effected by the radar antenna means having a plurality of transmit/receive modules of solid-state construction.

14. A method as set forth in claim 9, wherein the step of simultaneously generating two or more focused coherent transmitted subaperture beams also causes the formation of an interferometric array pattern between any adjacent divergent portions of two adjoining transmit subaperture beams where the interferometric array pattern is a function of $\Theta$ that is equal to the numerator product of the sine of $\pi$ times L over $\lambda$ times the sine of $\Theta$; and with this product being over the denominator product of the sine of $\pi$ times L over N times $\lambda$ then times the sine of $\Theta$; where $\pi$ is a known constant, L is the focal distance of any transmitted beam relative to its transmit subaperture segment, N is the number of transmit subaperture segments for any transmit operative cycle of the radar antenna means, $\lambda$ is the radiation wavelength radiated by any transmitted beam during an operative cycle of the antenna means and $\Theta$ is the apex angle at the focal point between the convergent/divergent portions of any transmit subaperture beam.

* * * * *